US008587664B2

(12) United States Patent
McKeown et al.

(10) Patent No.: US 8,587,664 B2
(45) Date of Patent: Nov. 19, 2013

(54) TARGET IDENTIFICATION AND LOCATION SYSTEM AND A METHOD THEREOF

(75) Inventors: Donald M. McKeown, Warsaw, NY (US); Michael J. Richardson, Spencerport, NY (US)

(73) Assignee: Rochester Institute of Technology, Rochester, NY (US)

( * ) Notice: Subject to any disclaimer, the term of this patent is extended or adjusted under 35 U.S.C. 154(b) by 1458 days.

(21) Appl. No.: 11/048,605

(22) Filed: Feb. 1, 2005

(65) Prior Publication Data

US 2005/0253928 A1 Nov. 17, 2005

Related U.S. Application Data

(60) Provisional application No. 60/541,189, filed on Feb. 2, 2004.

(51) Int. Cl.
*H04N 5/33* (2006.01)

(52) U.S. Cl.
USPC .......................................... 348/164; 340/577

(58) Field of Classification Search
USPC ......... 348/164, 231.6, 143, 169, 211, 211.15, 348/144, 161, 232, 14.02, 239, 552; 382/103, 312, 318
See application file for complete search history.

(56) References Cited

U.S. PATENT DOCUMENTS

| | | | | |
|---|---|---|---|---|
| 6,313,951 B1 * | 11/2001 | Manhart et al. | ............... | 359/642 |
| 6,556,981 B2 * | 4/2003 | Pedersen et al. | ............... | 706/44 |
| 7,151,565 B1 * | 12/2006 | Wada et al. | ............... | 348/231.6 |
| 2002/0015536 A1 * | 2/2002 | Warren et al. | ................. | 382/284 |
| 2002/0021221 A1 * | 2/2002 | Okamoto et al. | ............. | 340/577 |
| 2002/0026431 A1 * | 2/2002 | Pedersen et al. | ................... | 706/1 |
| 2003/0075642 A1 * | 4/2003 | Silansky et al. | ................. | 244/30 |
| 2003/0083790 A1 * | 5/2003 | Hattori et al. | ...................... | 701/1 |
| 2005/0029458 A1 * | 2/2005 | Geng et al. | .................... | 250/347 |
| 2006/0074958 A1 * | 4/2006 | Biacs | ........................... | 707/101 |
| 2006/0120714 A1 * | 6/2006 | Wesselink et al. | ............. | 396/427 |
| 2006/0291849 A1 * | 12/2006 | Shamir et al. | ................ | 396/334 |
| 2008/0181454 A1 * | 7/2008 | Wirtz et al. | .................. | 382/103 |

* cited by examiner

*Primary Examiner* — Behrooz Senfi
(74) *Attorney, Agent, or Firm* — Joseph M. Noto; Bond Schoeneck & King, PLLC

(57) ABSTRACT

A system and method of identifying and locating one or more targets includes capturing one or more frames and recording position data for each of the frames. Each of the frames comprises a plurality of at least three different types of infrared image data. Each of the targets is identified and a location is provided based on the three different types of captured infrared image data in each of the frames and the recorded position data.

25 Claims, 10 Drawing Sheets

| REQUIREMENT | TARGET IDENTIFICATION SYSTEM |
|---|---|
| FIRE DETECTION THRESHOLD | 0.25 METER CIRCULAR AT 400K |
| GROUND SWATH | 10 km |
| NADIR GROUND SAMPLE DISTANCE | 3.0 m |
| SPECTRAL BANDS | LWIR, MWIR, SWIR, VNIR OPTIONAL |
| GEO-LOCATION (RELATIVE) | 10 m HORIZONTAL (1σ) |
| DYNAMIC RANGE | 14 BIT |
| OPERATING ALTITUDE (NOMINAL) | 3 km |
| GROUND SPEED | 76 m/s UP TO 182 m/s |
| SYSTEM WEIGHT | < 98 kg |
| SYSTEM POWER | < 540 W |
| OPERATOR WORK LOAD | LOW |
| DATA TIMELINES | TRACEABLE TO REALTIME |
| OPERATIONAL TIME | DAY/NIGHT |
| ENVIRONMENT | UNPRESSURIZED |

*FIG. 7*

TARGET IDENTIFICATION AND LOCATION SYSTEM AND A METHOD THEREOF

This application claims the benefit of U.S. Provisional Patent Application Ser. No. 60/541,189 filed Feb. 2, 2004 which is hereby incorporated by reference in its entirety.

This invention was developed with government funding from NASA under grant no. 30324 awarded on Sep. 10, 2002. The U.S. Government may have certain rights.

FIELD OF THE INVENTION

The present invention relates generally to image monitoring systems and, more particularly, to a target identification and location system for identifying and precisely locating one or more targets, such as a wildfire, and a method thereof.

BACKGROUND

Current wildfire detection and monitoring systems utilize multispectral line scanning sensors on aerial platforms. Examples of these types of systems include the MODIS Airborne Simulator (MAS) sensor demonstrated by NASA Ames on the ER-2 and the US Forest Service PHOENIX System flown on a Cessna Citation Bravo. These systems have demonstrated substantial utility in detecting and monitoring wildfires from airborne platforms. However, these systems are custom engineered from the "ground up" relying on custom design and fabrication of complex opto-mechanical servos, sensors, readout electronics and packaging. As a result, these systems are subject to malfunction and are difficult to service.

A typical fire detection mission scenario involves imaging a 10 km swath from an aircraft at 3 km altitude over an area of fire danger. Missions are usually conducted at night to reduce false alarms due to solar heating. Existing systems employ a line scanning, mid-wave infrared (MWIR) band as the primary fire detection band along with a long wave infrared (LWIR) band which provides scene context. By combining the MWIR and LWIR data, a hot spot detected by the MWIR band can be located with respect to ground features imaged in the LWIR band. The line scanner provides excellent band to band registration, but requires a complex rate controlled scanning mirror and significant post processing to correct for scan line to scan line variations in aircraft attitude and ground speed. These sensitive scanning mechanisms are also prone to failure and are difficult to service. While the location of the detected fires is shown in the image, there is no actual computation of a specific ground coordinate for each fire pixel. This requires a specially trained image interpreter to analyze each image and manually measure the latitude and longitude of each fire pixel.

SUMMARY OF THE INVENTION

A target identification and location system in accordance with embodiments of the present invention includes at least three different infrared imaging sensors, a positioning system, and an image data processing system. The image data processing system identifies and provides a location of one or more targets based on image data from the at least three different infrared cameras and positioning data from the positioning system.

A method of identifying and locating one or more targets in accordance with embodiments of the present invention includes capturing one or more frames and recording position data for each of the frames. Each of the frames comprises a plurality of at least three different types of infrared image data. Each of the targets is identified and a location is provided based on the three different types of captured infrared image data in each of the frames and the recorded position data.

The present invention provides a system and method for identifying and providing a precise location of one or more targets, such as a wildfire. More specifically, the present invention provides a significant increase in wildfire detection and monitoring capability, real time automated geo-location of a target, a significantly improved operational reliability and ease of use, and lower operating costs than with prior sensing systems. The present invention also has a lower false alarm rate than with prior fire sensing systems allowing reliable day and night operations

BRIEF DESCRIPTION OF THE DRAWINGS

FIG. 7 is a table of specifications for one example of the target identification and location system;

DETAILED DESCRIPTION

Figure 1:
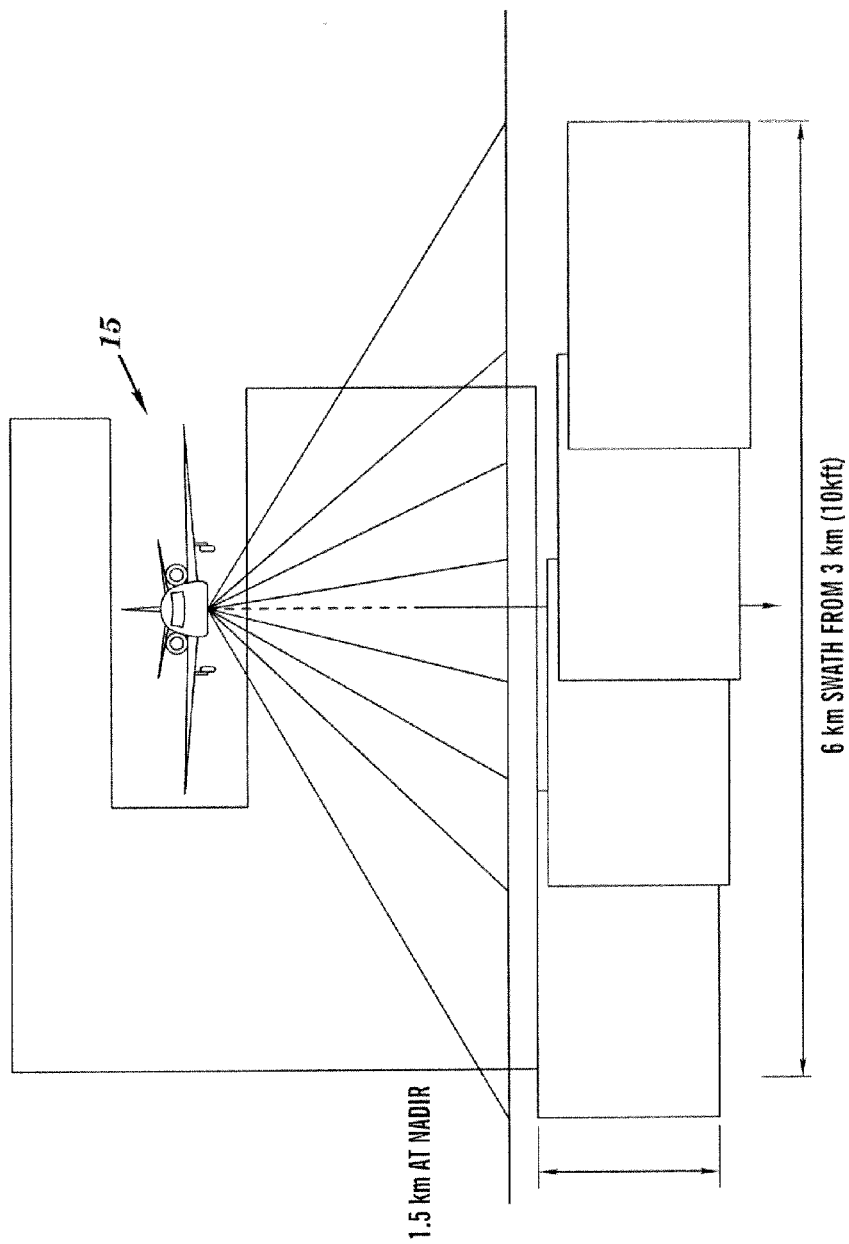
FIG. 1 is a perspective view of a plane with a target identification and location system in accordance with embodiments of the present invention.

A target identification and location system 10 in accordance with embodiments of the present invention in an aircraft 15 is illustrated in FIGS. 1-6 and 8. The target identification and location system 10 includes an imaging system 11 with a LWIR imaging sensor 12, a MWIR imaging sensor 14, a short wave infrared (SWIR) imaging sensor 16, a very near infrared (VNIR) imaging sensor 18, a global positioning system 20, an inertial measurement system 22, and an image data processing system 24, although the target identification and location system 10 can include other types and numbers of components connected in other manners. The present invention provides a system 10 and method for identifying and providing a precise location of one or more targets, such as a wildfire. More specifically, the present invention provides a significant increase in wildfire detection and monitoring capability, real time automated geo-location of a target, a significantly improved operational reliability and ease of use, and lower operating costs than with prior sensing systems.

Referring to FIGS. 1 and 3-5, the target identification and location system 10 is mounted in an electronics rack assembly 26 and a sensor mounting system 28 in an aircraft 15, although the target identification and location system 10 can be mounted with other types of mounting systems and in other types of vehicles. The electronics rack assembly 26 is used to secure the image data processing system 10 in the aircraft, although the image data processing systems could be secured in other manners in other locations. The sensor mounting system 28 is mounted to a floor 30 of the aircraft 15 above an opening or window, although the sensor mounting system 28 could be mounted on other surfaces in other locations, such as on the outside of the aircraft 15.

The sensor mounting assembly 28 includes a single axis positioning assembly 32, such as a gimbal assembly, that supports and allows for pivotal motion of the imaging system 11 about a first axis A-A, although other types of mounting systems for the single axis positioning assembly could be used. The single axis positioning system 32 allows the line of sight of the LWIR imaging sensor 12, the MWIR imaging sensor 14, the SWIR imaging sensor 16, the VNIR imaging sensor 18 in the imaging system 11 to pivot to provide a wide field of view for imaging the ground. In this particular embodiment, the lines of sight of the LWIR imaging sensor 12, the MWIR imaging sensor 14, the SWIR imaging sensor 16, the VNIR imaging sensor 18 can be pivoted across a swath +/−40 degrees for a total imaging swath of +/−60 degrees (taking into account the 40 degree field of view for each imaging sensor 12, 14, 16, and 18), although the lines of sight can be pivoted other amounts and the imaging sensors could have other ranges for the field of view.

Referring to FIGS. 1-3, 5, 6, and 8, the imaging system 11 includes LWIR imaging sensor 12, the MWIR imaging sensor 14, the SWIR imaging sensor 16, the VNIR imaging sensor 18 which are each used to capture infrared images or infrared image data for target identification and location to provide a location of the one or more targets, although the imaging system 11 can include other types and numbers of imaging sensors, such as a visible imaging sensor 19 for capturing one or more visible images in each of the frames. In this particular embodiment, the spectral ranges for the LWIR imaging sensor 12 is about 8.0-9.2 microns, the spectral range for the MWIR imaging sensor 14 is about 3.0-5.0 microns, the spectral range for the SWIR imaging sensor 16 is about 0.9-1.7 microns, and the spectral range for the VNIR imaging sensor 18 is about 0.4-0.9 microns, although the imaging sensors could have other spectral ranges which are either spaced apart or partially overlap and other types of imaging sensors can be used. The LWIR imaging sensor 12, the MWIR imaging sensor 14, the SWIR imaging sensor 16, the VNIR imaging sensor 18 are large area format camera systems, instead of line scanning imaging systems, although systems with other types of formats can be used. The imaging system 11 transmits data about the captured image data to the image data processing system 24 via an image interface system 34.

Figure 2:
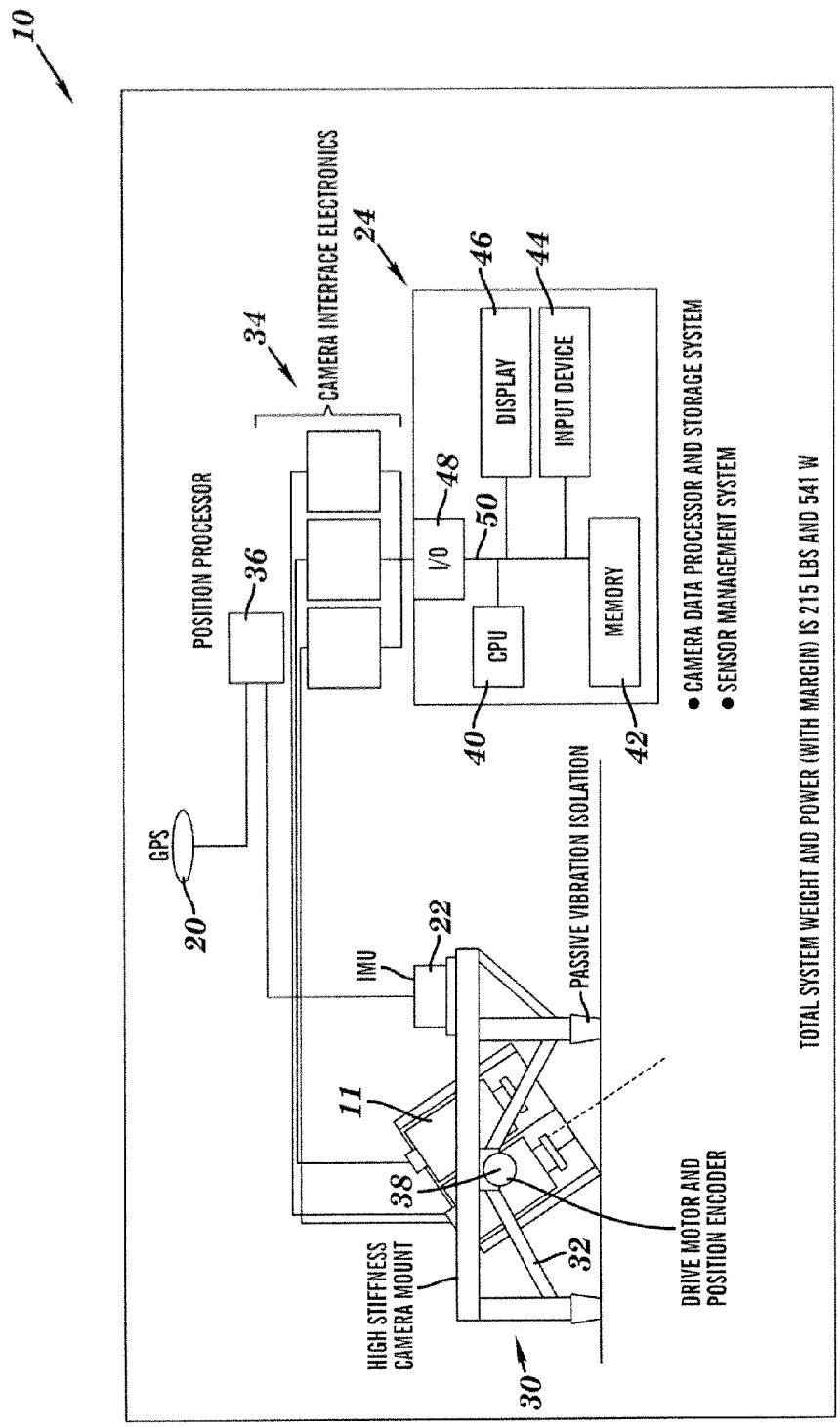
FIG. 2 is a block diagram of the target identification and location system shown in FIG. 1.
Figure 3:
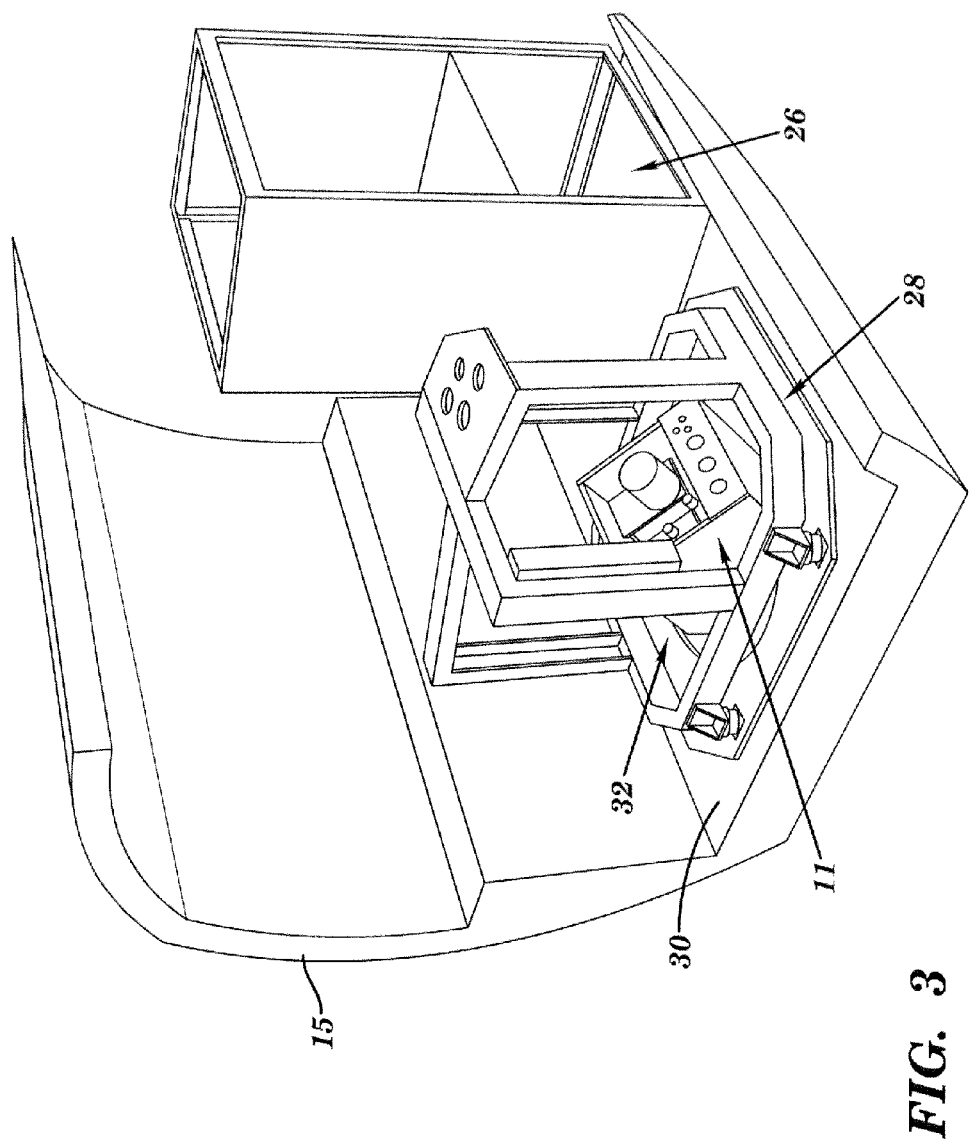
FIG. 3 is a section of the plane shown in FIG. 1 with a partial, perspective view of the supporting assemblies for the target identification and location system.
Figure 4:
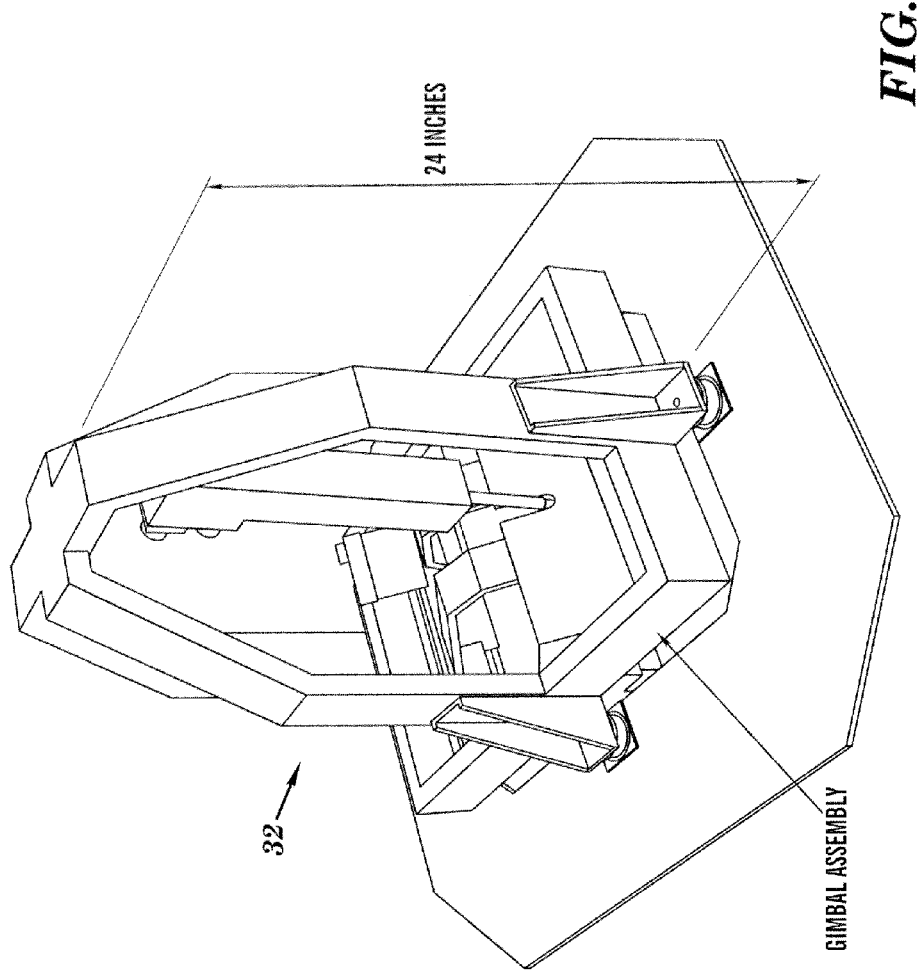
FIG. 4 is a perspective view of the gimbal assembly.
Figure 5:
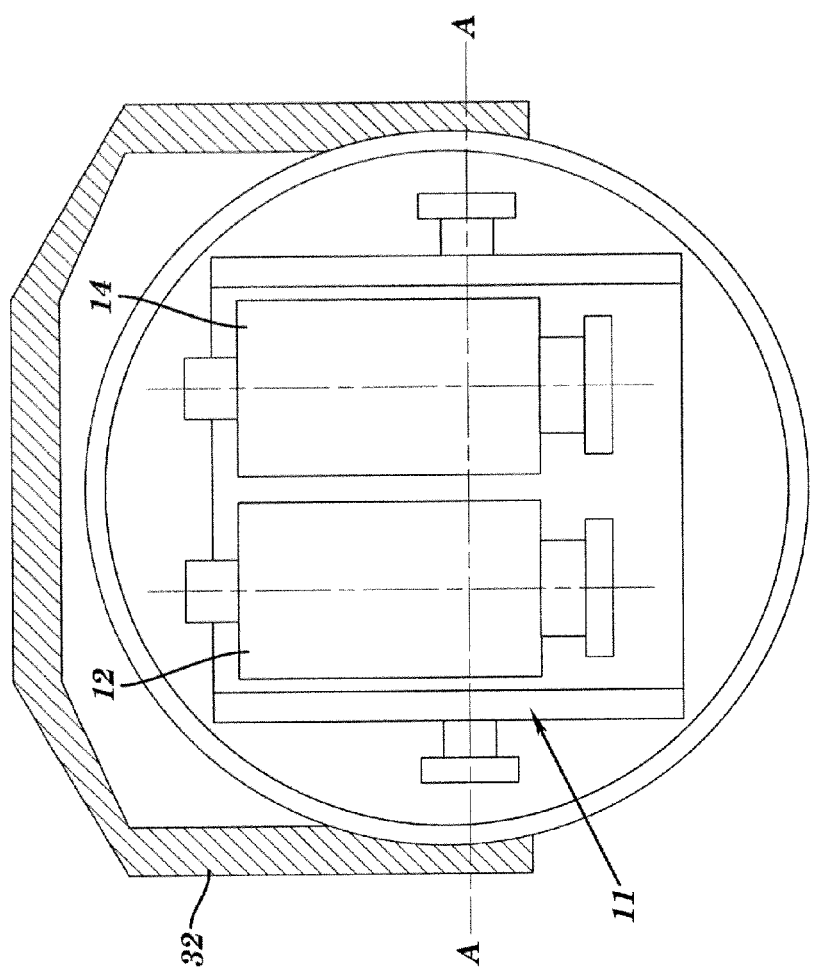
FIG. 5 is a side, partial cross-sectional view of the gimbal assembly shown in FIG. 4.
Figure 6:
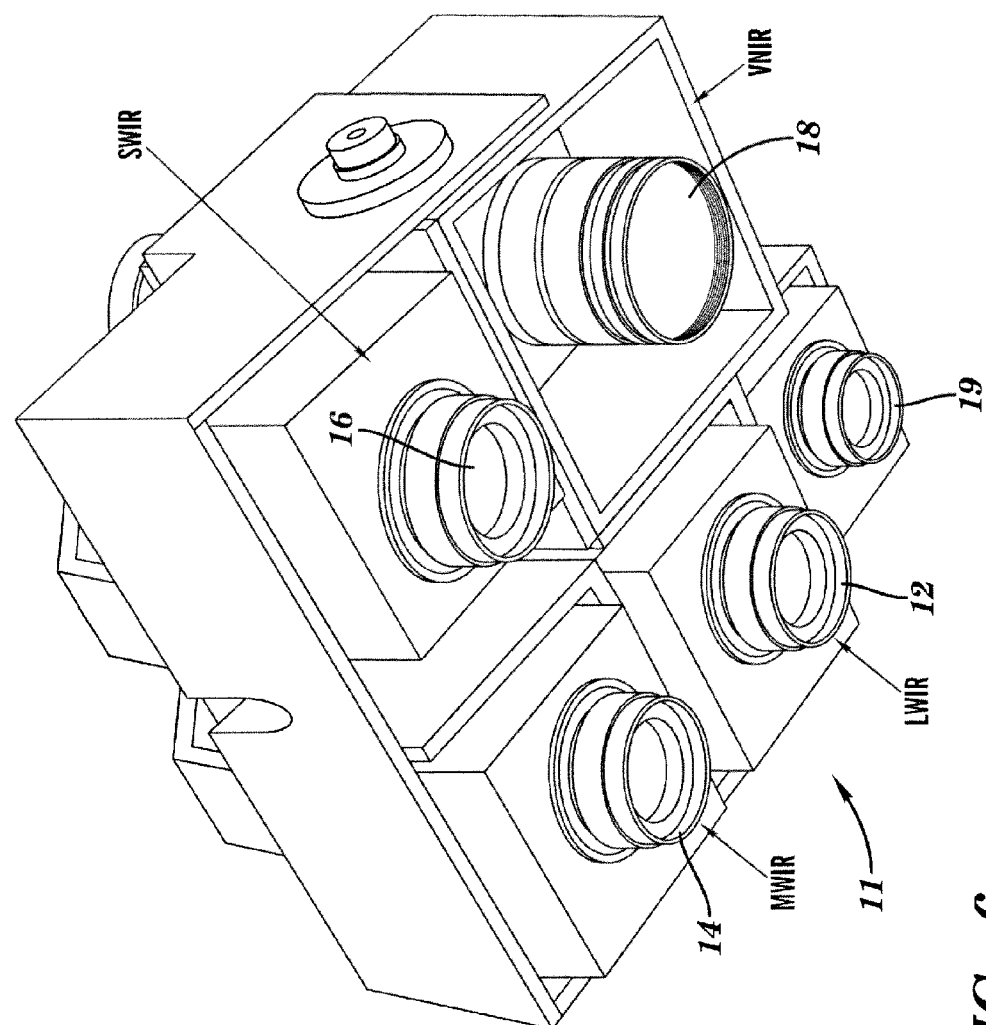
FIG. 6 is a perspective view of an imaging system in the target identification and location system.
Figure 8:
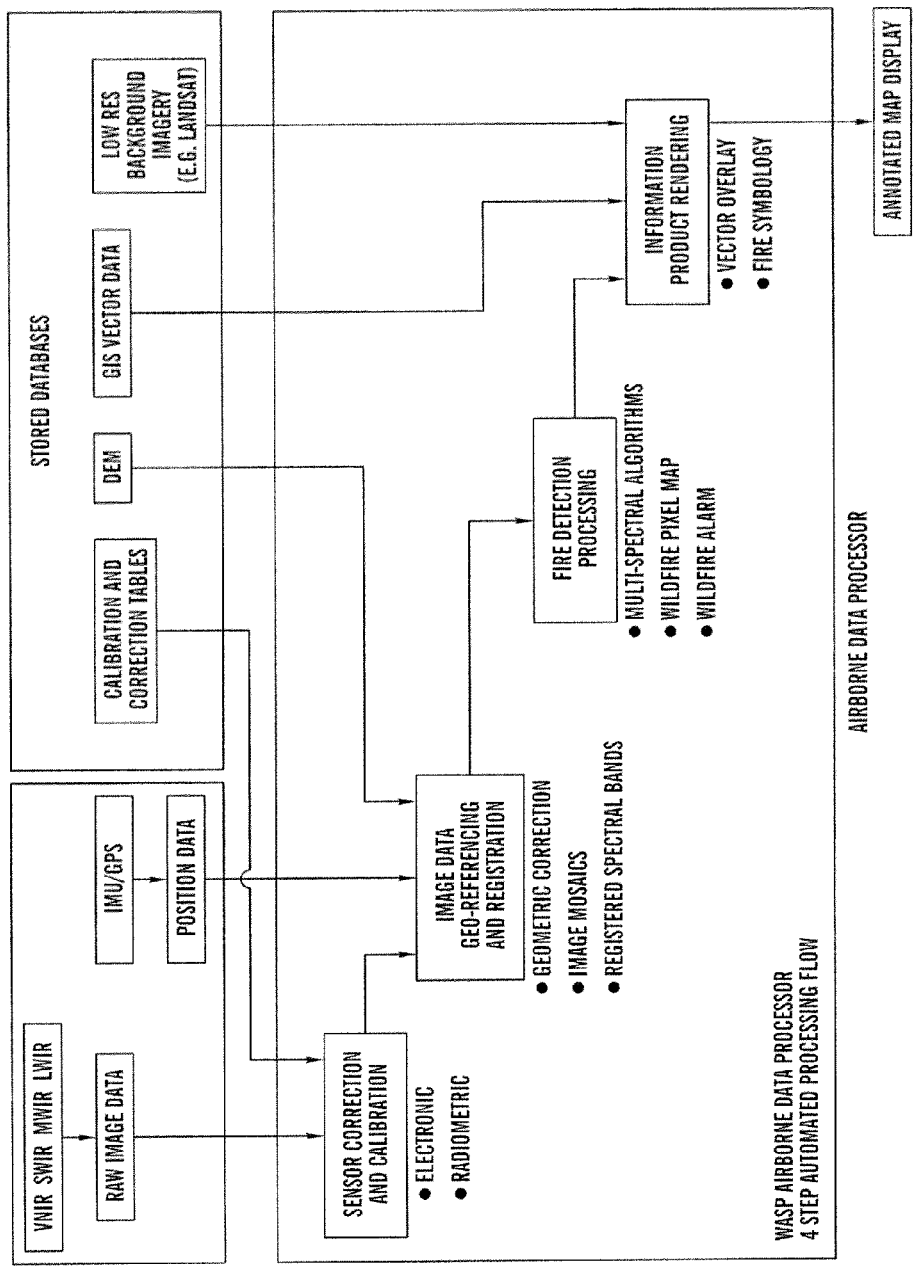
FIG. 8 is a functional block diagram of a method for identifying a target in accordance with embodiments of the present invention.
Figure 9:
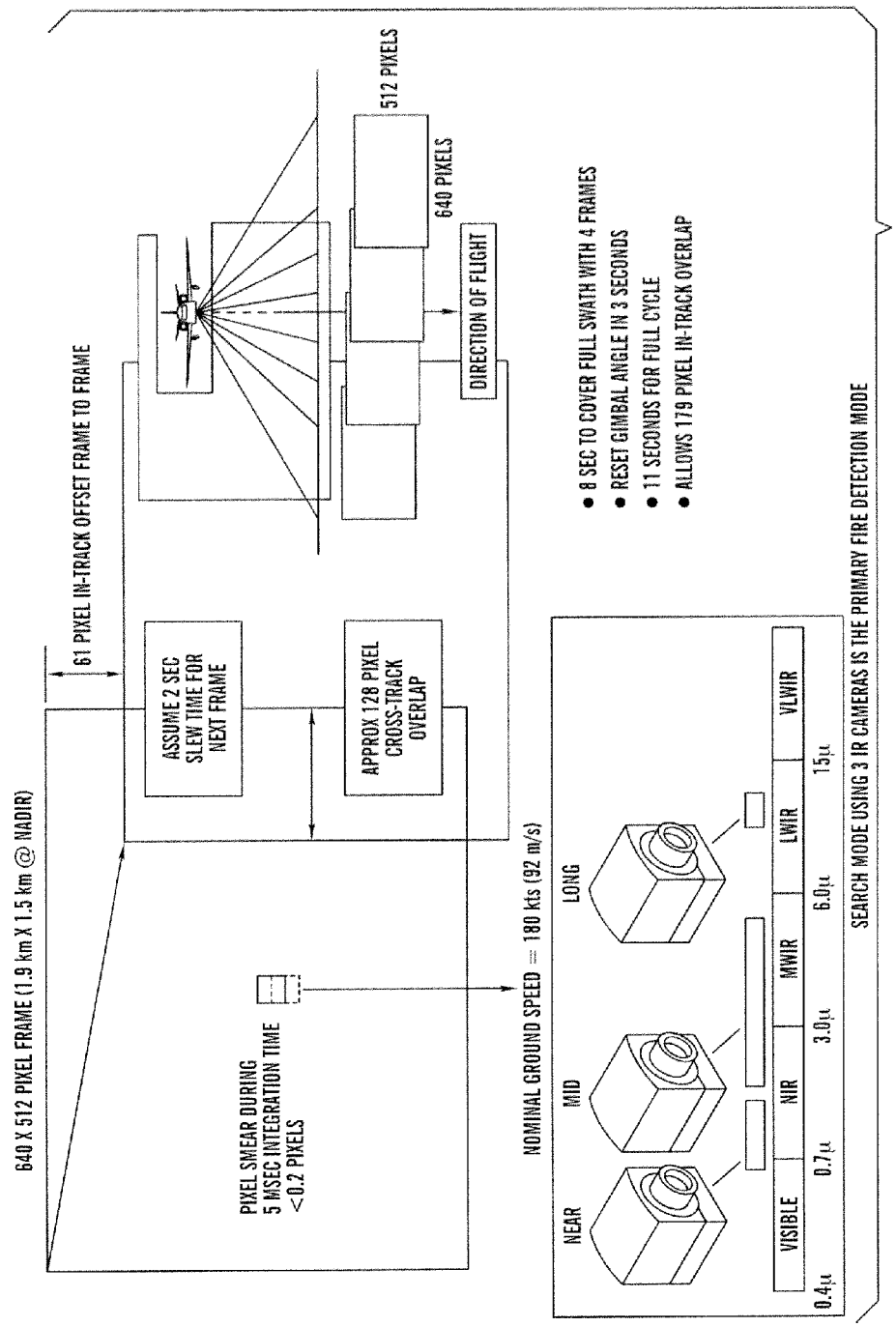
FIG. 9 is a functional block diagram of a method for detecting a target in accordance with embodiments of the present invention.

Referring to FIGS. 2, 3, and 8, the global positioning system 20 and the inertial measurement system 22 are mounted to the sensor mounting assembly, although other types and numbers of positioning systems can be used. The global positioning system 20 includes provides precise positioning data and the inertial measurement system provides inertial measurement data about each of the frames of captured image data by the imaging system 11 to a position processor 36. The global positioning system 20 also provides precise data about the line of sight of the cameras. Additionally, a precision encoder and drive motor system 38 is mounted to a drive axis A-A for the single axis positioning system 32 and provides position data about the imaging system 11 to the position processor 36. The position processor 36 determines the precise location of each of the frames of image data based on position data from the global positioning system 20, the inertial measurement system 22, and the precision encoder and drive motor system 38 and transmits the locations to the image data processing system 24, although the location can be determined by other systems, such as the image data processing system 24.

The data image processing system 24 includes a central processing unit (CPU) or processor 40, a memory 42, an input device 44, a display 46, and an input/output interface system 48 which are coupled together by a bus or other communication link 50, although other types of processing systems comprising other numbers and types of components in other configurations can be used. The processor 40 executes a program of stored instructions for one or more aspects of the present invention as described herein, including a method for identifying and providing a precise location for the one or more targets as described and illustrated herein.

The memory 42 stores the programmed instructions for one or more aspects of the present invention as described herein including the method identifying and providing a precise location for the one or more targets as described herein, although some or all of the programmed instructions could be stored and/or executed elsewhere. The memory 42 also stores calibration and correction tables for each of the imaging sensors 12, 14, 16, 18, and 19 in the imaging system 11 in tables. A Digital Elevation Model (DEM) is also stored in memory 42 and is used to provide terrain elevation information which will be used by the processor 40 for precise geolocation of the imagery. Additionally, vector data from a geospatial information system (GIS), such as roads, water bodies and drainage, and other manmade and natural landscape features I stored in memory 42 and will be used in the processor 40 to combine with or annotate the imagery. Other data sets stored in memory 42 may include relatively low resolution imagery from sources such as LANDSAT that would be used by the processor 40 to provide overall scene context. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to the processor, can be used for memory 42 to store the programmed instructions described herein, as well as other information.

The input device 44 enables an operator to generate and transmit signals or commands to the processor 40. A variety of different types of input devices can be used for input device 44, such as a keyboard or computer mouse. The display 44 displays information for the operator. A variety of different types of displays can be used for display 44, such as a CRT display. The input/output interface system 48 is used to operatively couple and communicate between the image data processing system 24 and other devices and systems, such as the LWIR imaging sensor 12, MWIR imaging sensor 14, SWIR imaging sensor 16, VNIR imaging sensor 18, global positioning system 20, inertial measurement system 22, and precision encoder and drive motor system 38. A variety of communication systems and/or methods can be used, such as a direct connection, a local area network, a wide area network, the world wide web, modems and phone lines, and wireless communication technology each having their own communications protocols.

By way of example only, a table of specifications for one example of the target identification and location system 10 is shown in FIG. 7, although the target identification and location system 10 can be configured to have other specifications. Also, by way of example only, the weight of the target identification and location system 10 is estimated to be less than 220 lb and maximum operating power less than 550 W. As a result, the present invention weighs less and uses less power than prior systems.

The operation of the target identification and location system 10 in accordance with embodiments of the present invention will now be described with reference to FIGS. 1-6 and 8-10. The target identification and location system 10 in the aircraft 15 collects a mosaic of frames across a full swath by "stepping" the line of sight of the imaging system 11 across the swath using the single-axis positioning system 32 with the drive motor and position encoder system 38. The drive motor and position encoder system 32 steps the imaging system 11 through different positions about the axis A-A and transmits the position data about the imaging system 11 for each positions of each frame of the captured image data to the image data processing system 24. After a full swath of image data is acquired, the single-axis positioning system 32 resets the line of sight of the imaging system 11 to complete the cycle. By way of example only, a full swath is acquired in about eight seconds and typically no more than seventeen seconds, although other amounts of time to collect a full swath can be used. As a result, the present invention does not need complex and expensive rate controlled servo mechanisms to capture frames, since each frame is captured from a static position.

In these embodiments, four frames are acquired by the imaging system 11 over the swath which covers an area of up to 10 km, although other numbers of frames can be acquired over other areas. The imaging system 11 captures each of the four frames across the swath using at least three of the LWIR imaging sensor 12, MWIR imaging sensor 14, SWIR imaging sensor 16, and VNIR imaging sensor 18 to capture image data in three spectral bands, although other numbers and types of imaging sensors can be used and other spectral bands can be acquired. To accurately identify one or more targets, such as wildfires, the present invention acquires image data in LWIR, MWIR, and SWIR bands during nighttime hours and acquires image data in LWIR, MWIR, SWIR, and VNIR bands during daylight. With respect to the image data which is acquired, the image data processing system 24 retrieves calibration and correction data from tables stored in memory 42 for each of the imaging sensors 12, 14, 16, and 18 in the imaging system 11 and makes adjustments to the captured image data based on the retrieved calibration and correction data.

Next, the image data processing system 24 with the position processor 36 performs geo-referencing and registration on the corrected and calibrated image data. The global positioning system 20, the inertial measurement system 22, and the drive motor and encoder system 38 provide the image data processing unit 24 and the position processor 36 with the global position data, inertial measurement data, and imaging system 11 positioning data, respectively, for each frame of the corrected and calibrated image data, although other positioning data could be provided. The image data processing system 24 with the position processor 36 also receive data about the operating parameters of the aircraft 15 at the time the frames of image data are captured. As the aircraft 15 moves while collecting the full swath, there is a slight in-track offset from frame to frame of about 61 pixels (12% of the image), although the offset can vary depending on the operating characteristics of the aircraft 15, for example the speed of the aircraft 15. The motion of the aircraft 15 will also produce less than 0.5 pixel of image motion smear during a nominal 15 ms integration time at a nominal ground speed of 180 knots, although the smear will also vary depending on the operating characteristics of the aircraft 15. The image data processing system 24 with the position processor 36 use the obtained position data and the data related to the slight in-track offset and the image motion smear to adjust the image data in each of the frames. The image data processing system 24 with the position processor 36 obtains a precise measurement of the orientation and position of each imaging sensor 12, 14, 16, and 18 for each frame of imagery. The position processor 36 utilizes data from a combination of a precision GPS 20 and an inertial measurement unit 22. The image data processing system 24 combines the measured image sensor position and orientation data with known camera internal orientation geometry and the DEM using photogrammetric techniques to calculate a fully corrected image for each frame.

The image data processing system 24 performs a two step registration process on the image data from the imaging system 11 for each of the frames to create a substantially full swath mosaic. First, the image data processing system 24 performs a band to band registration which aligns the image data for the three different captured bands for each frame into one frame. Next, the image data processing system 24 performs a frame to frame registration which produces a full swath mosaic. By way of example, the image data processing system 24 may use a method for frame to frame registration, such as the method and apparatus for mapping and measuring land disclosed in U.S. Pat. No. 5,247,356, which is herein incorporated by reference in its entirety. The relative alignment of each of the image sensors 12, 14, 16, and 18 is calculated through a pre-operation calibration process in which the image sensors 12, 14, 16, and 18 simultaneously image a known set of ground or laboratory targets. The relative offsets and rotations are determined from this image set and programmed into the processor 40.

Figure 10:
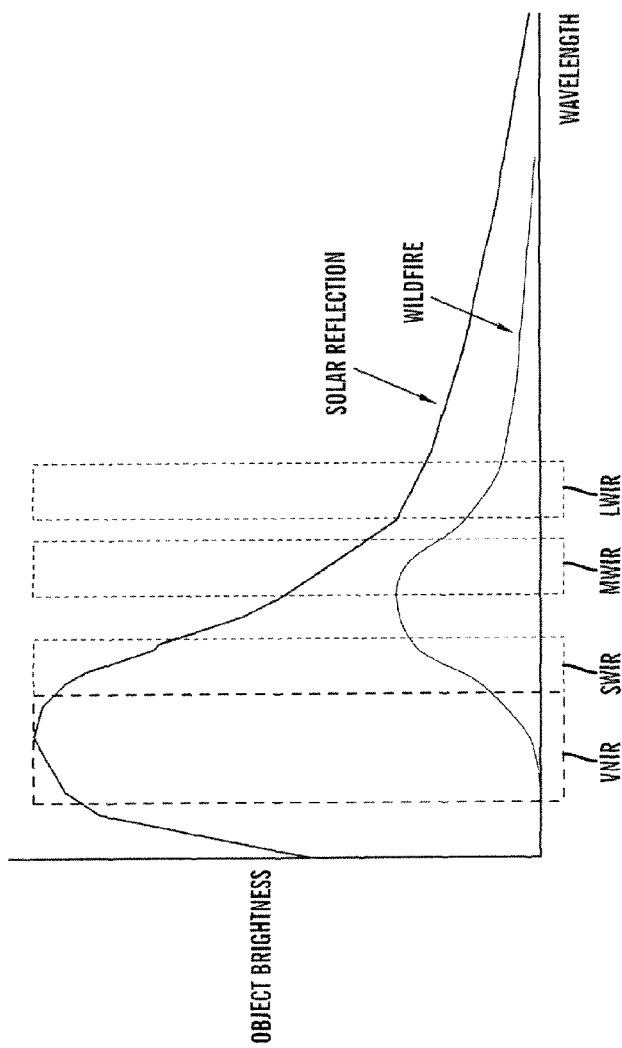
FIG. 10 is a graph of multi-spectral images to discriminate a fire from a solar reflection.

Next, the image data processing system 24 processes the image data to identify and discriminate a target, such as a wildfire, from other items. Typical processing by processor 40 may include the calculation of a ratio of apparent brightness for each pixel and comparing that to a pre-determined threshold. The inclusion of a third spectral band allows the application of more sophisticated algorithms than would be possible using only two bands. One example of this processing is illustrated in FIG. 10 where image data from LWIR imaging sensor 12, the MWIR imaging sensor 14, the SWIR imaging sensor 16, and the visible imaging sensor 19 to identify and discriminate a wildfire from a solar reflection.

Next, the image data processing system 24 generates an output, such as an annotated map, on the display 46 to identify the type and location of the target(s), although other types of displays could be generated or stored for later use. To add information value to the displayed imagery, relevant GIS vector data may be inserted as an overlay. Low resolution data, for example RGB LANDSAT data, may be displayed alongside LWIR data to provide a visible context to the imagery.

The present invention provides a system and method for identifying and providing a precise location of one or more targets, such as a wildfire. In particular, the present invention provides the wildfire management community with the capability to detect and monitor wildfires from either manned or UAV aerial platforms. The present invention extends the operational envelope into the daytime and also improves operability. The extension of mission capability into the daylight hours is enabled by the use of a SWIR imaging sensor 16 in addition to the bands provided by the MWIR imaging sensor 14 and the LWIR imaging sensor 12. The SWIR imaging sensor 16 helps to discriminate fire targets in daylight and also for detecting hot fires at night.

A very high resolution visible imaging sensor 19 can be used with the imaging system 11 to provide detailed scene context during daylight operations for each of the captured frames. The visible imaging sensor 19 would capture image data with the three or more of the LWIR imaging sensor 12, MWIR imaging sensor 14, SWIR imaging sensor 16, and VNIR imaging sensor 18 which are capturing image data. As a result, the present invention can not only identify and provide the location of one or more targets, but also can also provide a visible image of each of the targets. Use of a high resolution visible imaging sensor 19 also provides excellent spatial context and improves the frame registration process.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefor, is not intended to limit the claimed processes to any order except as may be specified in the claims. Accordingly, the invention is limited only by the following claims and equivalents thereto.

What is claimed is:

1. A target identification and location system comprising:
    at least three different types of infrared imaging sensors comprising a long wave infrared imaging sensor, a mid-wave infrared imaging sensor, and a short wave infrared imaging sensor, each of the at least three different types of infrared imaging sensors configured to acquire image data for different captured bands from the same frame of at least one frame of a swath;
    a positioning system; and
    an image data processing system that performs a band to band registration which aligns the image data for each of the different captured bands for each frame of the acquired frames of the swath into one composite frame, performs a frame to frame registration of the composite frames producing a full swath mosaic, identifies one or more fire targets based on one or more of the at least three different types of infrared image data in the aligned one composite frame and provides a location of the one or more fire targets based on positioning data from the positioning system.

2. The system as set forth in claim 1 wherein the at least three different types of infrared imaging sensors further comprise a very near infrared imaging sensor.

3. The system as set forth in claim 1 wherein the positioning system comprises a global positioning system.

4. The system as set forth in claim 3 wherein the positioning system further comprises a separate inertial measurement unit and wherein the positioning data further comprises global positioning data from the global positioning system and inertial measurement data from the inertial measurement unit.

5. The system as set forth in claim 1 further comprising a mounting assembly, the at least three infrared cameras pivotally mounted to the mounting assembly for motion about a single axis.

6. The system as set forth in claim 1 further comprising a visible imaging sensor that provides one or more visual images of one or more of the targets.

7. The system as set forth in claim 1 wherein the image data processing system identifies the one or more targets based on at least one characteristic in the image data.

8. The system as set forth in claim 7 wherein the characteristic is brightness.

9. The system as set forth in claim 1 wherein the provided location comprises an altitude and a longitude of one or more of the targets.

10. A method of identifying and locating one or more targets, the method comprising:
    capturing with each of at least three different types of infrared imaging sensors comprising a long wave infrared imaging sensor, a mid-wave infrared imaging sensor, and a short wave infrared imaging sensor, image data for different captured bands from the same frame of at least one frame of a swath, each of the captured frames comprising at least three different types of infrared image data;
    recording, by a processing device, position data for each of the captured frames;
    aligning, by the processing device, each of the different captured bands by performing a band to band registration which aligns the image for each of the captured frames of the swath into one composite frame and performing a frame to frame registration of each composite frame producing a full swath mosaic;
    identifying one or more fire targets with the processing device based on the at least three different types of captured infrared image data in the aligned one composite frame and providing a location of each of the fire targets based on the recorded position data.

11. The method as set forth in claim 10 wherein the capturing further comprises capturing for each of the frames very near infrared imaging data.

12. The method as set forth in claim 11 wherein the capturing comprises capturing for each of the frames long wave infrared image data, mid-wave infrared image data, short wave infrared image data, and very near infrared imaging data for the identifying and providing a location of each of the targets during daylight hours.

13. The method as set forth in claim 10 wherein the capturing comprises capturing for each of the frames long wave infrared image data, mid-wave infrared image data, and short wave infrared image data for the identifying and providing a location of each of the targets during nighttime hours.

14. The method as set forth in claim 10 wherein the recorded position data is determined with global positioning data for each of the frames.

15. The method as set forth in claim 14 wherein the recorded position data is further determined with inertial measurement data for each of the frames.

16. The method as set forth in claim 10 further comprising capturing one or more visible images associated with one or more of the frames.

17. The method as set forth in claim 10 wherein the identifying and providing a location of each of the targets is based on at least one characteristic in the captured infrared image data in the frames.

18. The method as set forth in claim 17 wherein the characteristic is brightness.

19. The method as set forth in claim 10 wherein the provided location comprises latitude and a longitude of one or more of the targets.

20. The system as set forth in claim 1 wherein each of the least three different types of infrared imaging sensors is an area format camera system.

21. The method as set forth in claim 10 wherein the capturing with at least three different types of infrared imaging sensors one or more frames further comprises capturing with the at least three different types of infrared imaging sensors the one or more frames in an area format.

22. The method as set forth in claim 10 wherein the capturing further comprises capturing the one or more frames with the at least three different types of infrared imaging sensors which are pivotally mounted for motion about a single axis.

23. The system as set forth in claim 4 wherein the positioning data further comprises a digital elevation model that provides terrain elevation information stored by the image data processing system.

24. The method as set forth in claim 15 wherein the recorded position data is further determined with a digital elevation model that provides terrain elevation information.

25. A target identification and location system comprising:
infrared imaging sensors comprising a long wave infrared imaging sensor, a mid-wave infrared imaging sensor, a short wave infrared imaging sensor, and a very near infrared imaging sensor, each of the infrared imaging sensors configured to acquire image data for different captured bands from the same frame of at least one frame of a swath;

a positioning system comprising a global positioning system and a separate inertial measurement unit, wherein positioning data comprises global positioning data from the global positioning system and inertial measurement data from the inertial measurement unit; and an image data processing system, comprising a digital elevation model that provides terrain elevation information stored by the image data processing system, that performs a band to band registration which aligns the image data for each of the different captured bands for each frame of the acquired frames of the swath into one composite frame, performs a frame to frame registration of the composite frames producing a full swath mosaic, identifies one or more fire targets based on the infrared image data in the aligned one composite frame and provides a location of the one or more fire targets based on positioning data from the positioning system.

* * * * *